(12) United States Patent
Kim et al.

(10) Patent No.: US 7,389,193 B2
(45) Date of Patent: Jun. 17, 2008

(54) APPARATUS AND METHOD FOR CALIBRATING TRANSMISSION PATHS IN A MULTICARRIER COMMUNICATION SYSTEM USING MULTIPLE ANTENNAS

(75) Inventors: Byung-Ki Kim, Suwon-si (KR); Jong-In Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/500,831

(22) Filed: Aug. 8, 2006

(65) Prior Publication Data
US 2007/0037519 A1  Feb. 15, 2007

(30) Foreign Application Priority Data
Aug. 8, 2005 (KR) .................. 10-2005-0072088

(51) Int. Cl.
*G01R 35/00* (2006.01)
*H04B 15/00* (2006.01)
*H04B 1/38* (2006.01)

(52) U.S. Cl. .................................. 702/106
(58) Field of Classification Search .......... 702/106
See application file for complete search history.

(56) References Cited

U.S. PATENT DOCUMENTS

| 7,310,304 | B2* | 12/2007 | Mody et al. ........... 370/208 |
| 2005/0009483 | A1* | 1/2005 | Eilts et al. ............ 455/136 |
| 2005/0220003 | A1* | 10/2005 | Palaskas et al. ....... 370/210 |
| 2006/0183504 | A1* | 8/2006 | Tanaka et al. ......... 455/561 |

\* cited by examiner

*Primary Examiner*—John E. Barlow, Jr.
*Assistant Examiner*—Cindy D. Khuu
(74) *Attorney, Agent, or Firm*—The Farrell Law Firm, PC (57) ABSTRACT

An apparatus and method for calibrating transmission paths in a multicarrier communication system using multiple antennas are provided. In the transmission path calibrating apparatus, a calibration processor generates reference signals to estimate distortions in phase and amplitude in transmission paths, allocates the generated reference signals to subcarriers which are different in each of the transmission paths, and calculates calibration vectors for the transmission paths using the generated reference signals and received reference signals received through the transmission paths. A baseband module IFFT-processes the generated reference signals allocated to the subcarriers and sends the IFFT signals in the transmission paths.

14 Claims, 8 Drawing Sheets

APPARATUS AND METHOD FOR CALIBRATING TRANSMISSION PATHS IN A MULTICARRIER COMMUNICATION SYSTEM USING MULTIPLE ANTENNAS

PRIORITY

This application claims priority under 35 U.S.C. §119 to an application entitled "Apparatus and Method for Calibrating Transmission Paths in a Multicarrier Communication System Using Multiple Antennas" filed in the Korean Intellectual Property Office on Aug. 8, 2005 and assigned Serial No. 2005-72088, the contents of which are incorporated herein by reference.

BACKGROUND OF THE INVENTION

1. Field of the Invention

The present invention relates generally to a multicarrier communication system using multiple antennas, and in particular, to an apparatus and method for calibrating transmission paths.

2. Description of the Related Art

A smart antenna system and a Multi-Input Multi-Output (MIMO) system are multiple antenna systems. The smart antenna system is an adaptive antenna array system using multiple antennas to automatically optimize a radiation pattern and/or a reception pattern according to a signal environment. The smart antenna system receives only a signal from the direction of an intended user and significantly reduces the level of noise caused by multiple access interference from the other directions by controlling the gain and phase of a signal in each antenna in a Base Station (BS). As frequency utilization reaches its limit, active studies have recently been conducted on improving the quality of mobile communications and systems suitable for high-speed data transmission. As a result, the smart antenna system is attracting more and more interest.

When the BS sends a signal omni-directionally to all Mobile Stations (MSs) within its coverage area, each of the MSs receives interference from signals for the other MSs as well as its own signal, thereby decreasing Signal-to-Noise Ratio (SNR). In contrast, the BS can steer a signal only in the direction of an intended MS by beamforming using the smart antenna system. Therefore, power is saved for signal transmission and interference is also reduced. Even within the same coverage area of the BS, an intended MS is actively located and a signal is directionally sent/received to/from the MS, minimizing interference to the other MSs. As a consequence, the BS may allocate saved power to other MSs and the decrease of inter-neighbor cell interference increases the channel capacity of the BS.

In applying the smart antenna system to Orthogonal Frequency Division Multiple Access (OFDMA) using multiple orthogonal frequency carriers, a beam weight vector is applied to the subcarrier of each antenna during beamforming in order to apply directivity to an intended direction. The beamforming takes place in a digital part and the resulting beams must be provided to the physical antennas prior to radiation in the air. However, the phases and amplitudes of the beam signals are distorted by an amplifier, an upconverter/downconverter, and a cable which have non-linear characteristics in the BS.

Accordingly, the smart antenna technology must be implemented alongside calibration technology to compensate for the phase and amplitude distortions. The overall performance of the smart antenna technology is predominantly dependent on calibration accuracy. In other words, accurate calibration improves the performance of the smart antenna technology by minimization of amplitude and phase mismatches. The calibration technology applies commonly to the downlink from the BS to the MS and the uplink from the MS to the BS.

Figure 1:
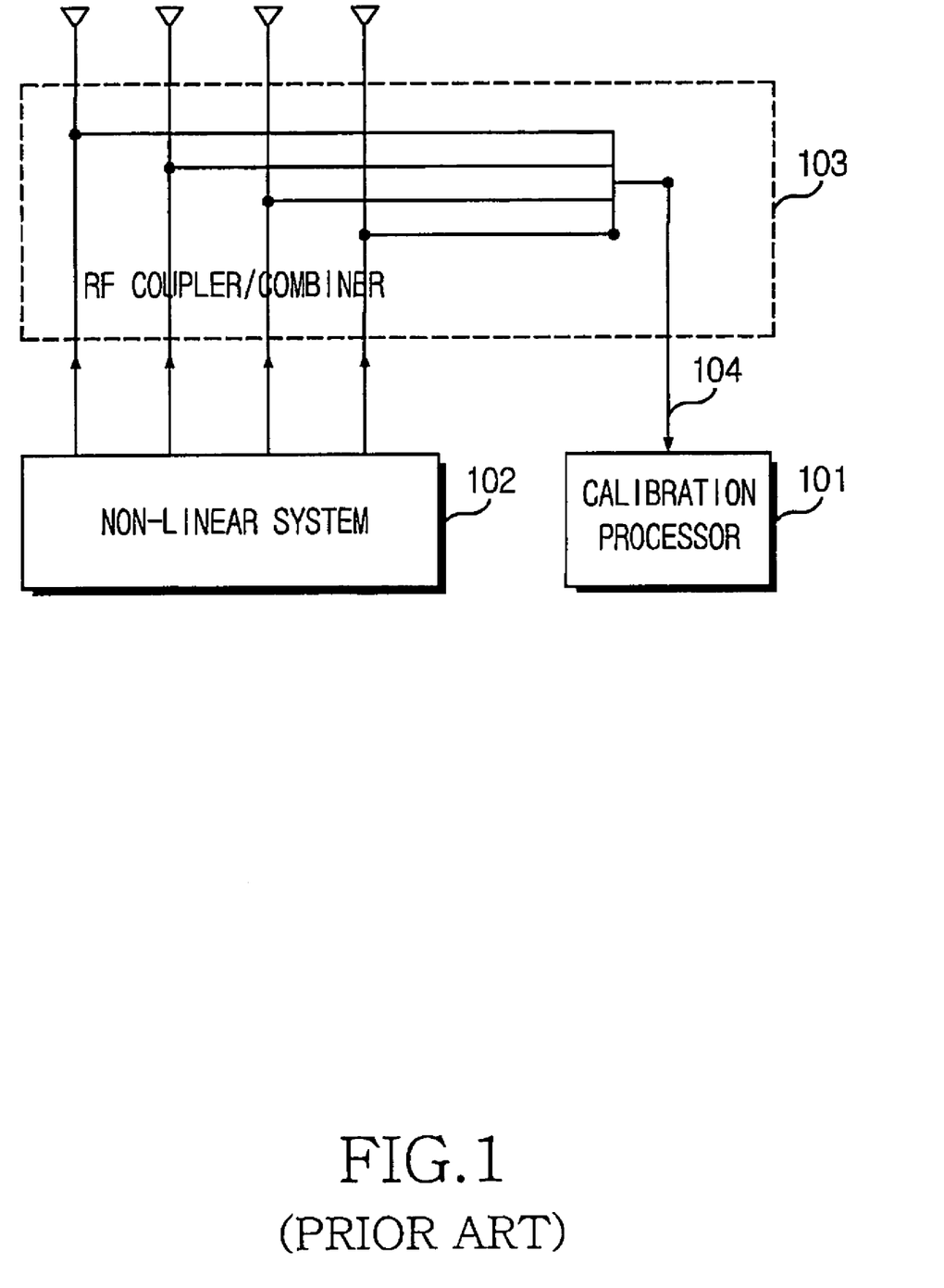
FIG. 1 is a block diagram of a typical transmission path calibrating apparatus in a multicarrier communication system using multiple antennas.

FIG. 1 is a block diagram of a typical transmission path calibrating apparatus in a multicarrier communication system using multiple antennas.

Referring to FIG. 1, a calibration processor 101 generates a reference signal to be propagated in a particular transmission path. A baseband processor (not shown) provides the reference signal to a non-linear system 102 in the transmission path. The non-linear system 102 oversamples the reference signal, modulates the oversampled signal to a Radio Frequency (RF) signal, and sends the RF signal in the transmission path. An RF coupler/combiner 103 couples the RF signal and transfers the coupled reference signal in a reception path 104. The calibration processor 101 estimates the change of phase and amplitude in the reference signal using the reference signal and the coupled reference signal and calculates a calibration vector based on the estimates. The calibration takes place sequentially for transmission paths.

Figure 2:
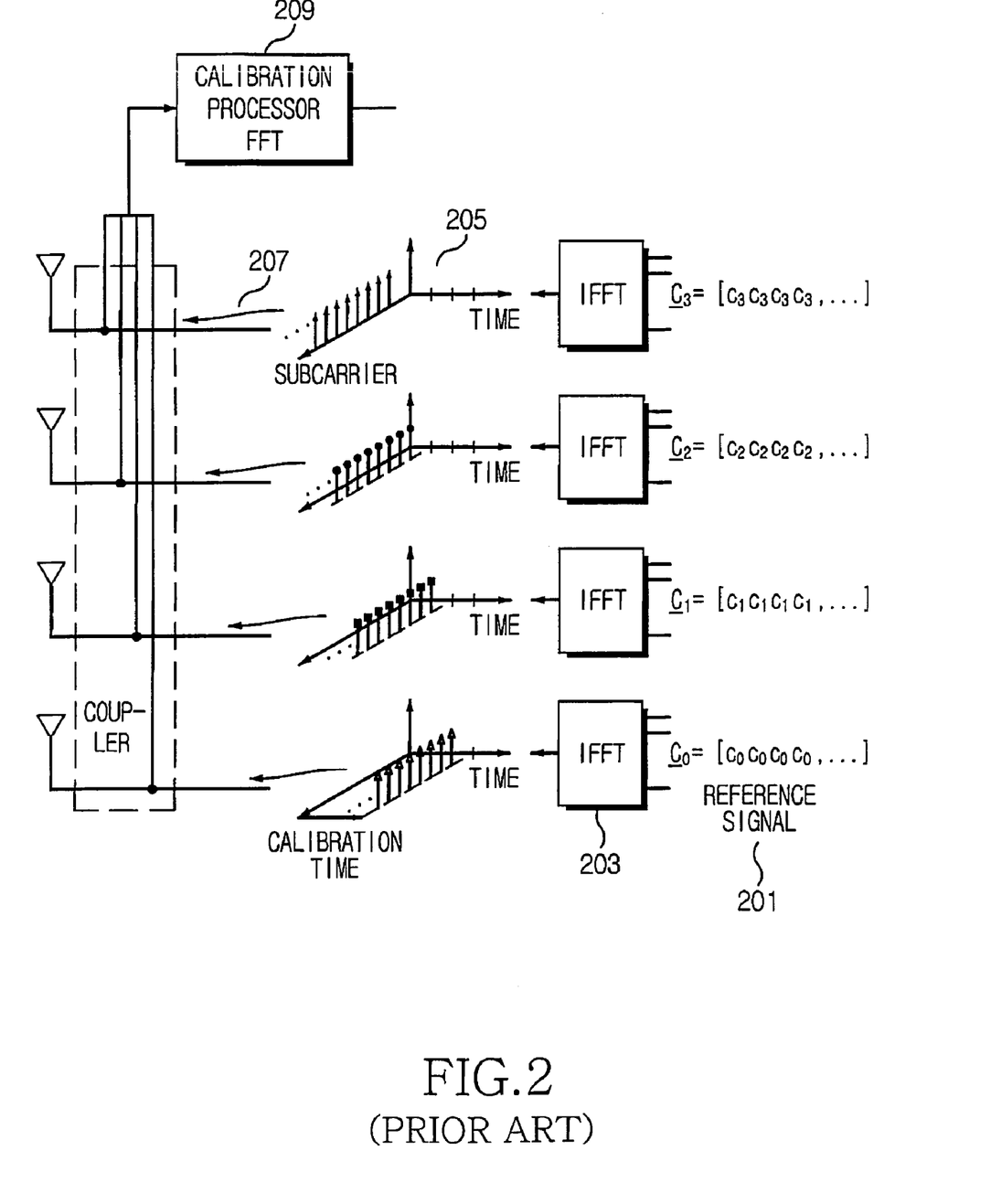
FIG. 2 illustrates a conventional calibration operation.

FIG. 2 illustrates a conventional calibration method. In OFDMA, phase and amplitude changes occurring in the non-linear system must be found for each subcarrier. Hence, a reference signal is sent over a total frequency band and a calibration vector for each transmission path is estimated using the response of the reference signal.

Referring to FIG. 2, the BS generates a reference signal 201 over a total frequency band, for calibration. The reference signal 201 is sent on subcarriers 205 through an Inverse Fast Fourier Transformer (IFFT) 203, travels in a predetermined path 207, and then is demodulated in a calibration processor Fast Fourier Transformer (FFT) 209. The BS estimates phase and amplitude differences for each transmission path in which the reference signal has been propagated in the above procedure.

Since calibration is performed sequentially for the transmission paths, calibration time is increased in proportion to the number of the transmission paths. The transmission characteristics of each path vary with time, which implies that calibration accuracy may be decreased. Also, data throughput is reduced because the reference signal is sent over the total frequency band in a predetermined transmission path during calibration of each transmission path.

SUMMARY OF THE INVENTION

An object of the present invention is to substantially solve at least the above problems and/or disadvantages and to provide at least the advantages below. Accordingly, an object of the present invention is to provide an apparatus and method for improved transmission path calibration, for use in a multicarrier communication system using multiple antennas.

Another object of the present invention is to provide an apparatus and method for calibrating all paths simultaneously based on orthogonality between subcarriers in applying path calibration technology to a multicarrier communication system using multiple antennas.

A further object of the present invention is to provide an apparatus and method for sending calibration signals for a plurality of paths simultaneously in order to minimize a data rate decrease caused by calibration signal transmission and increase calibration accuracy by reducing calibration time.

The above objects are achieved by providing an apparatus and method for calibrating transmission paths in a multicarrier communication system using multiple antennas.

According to one aspect of the present invention, in an apparatus for calibrating transmission paths in a multicarrier communication system using multiple antennas, a calibration processor generates reference signals to estimate distortions in phase and amplitude in transmission paths, allocates the reference signals to subcarriers which are different in each of the transmission paths, and calculates calibration vectors for the transmission paths using the reference signals and reference signals received through the transmission paths. A baseband module IFFT-processes the reference signals allocated to the subcarriers and sends the IFFT signals in the transmission paths.

According to another aspect of the present invention, in a method of calibrating transmission paths in a multicarrier communication system using multiple antennas, reference signals are generated to estimate distortions in phase and amplitude in transmission paths and allocated to subcarriers which are different in each of the transmission paths. The reference signals allocated to the subcarriers are IFFT-processed and sent in the transmission paths. Calibration vectors for the transmission paths are calculated using the reference signals and reference signals received through the transmission paths.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 3:
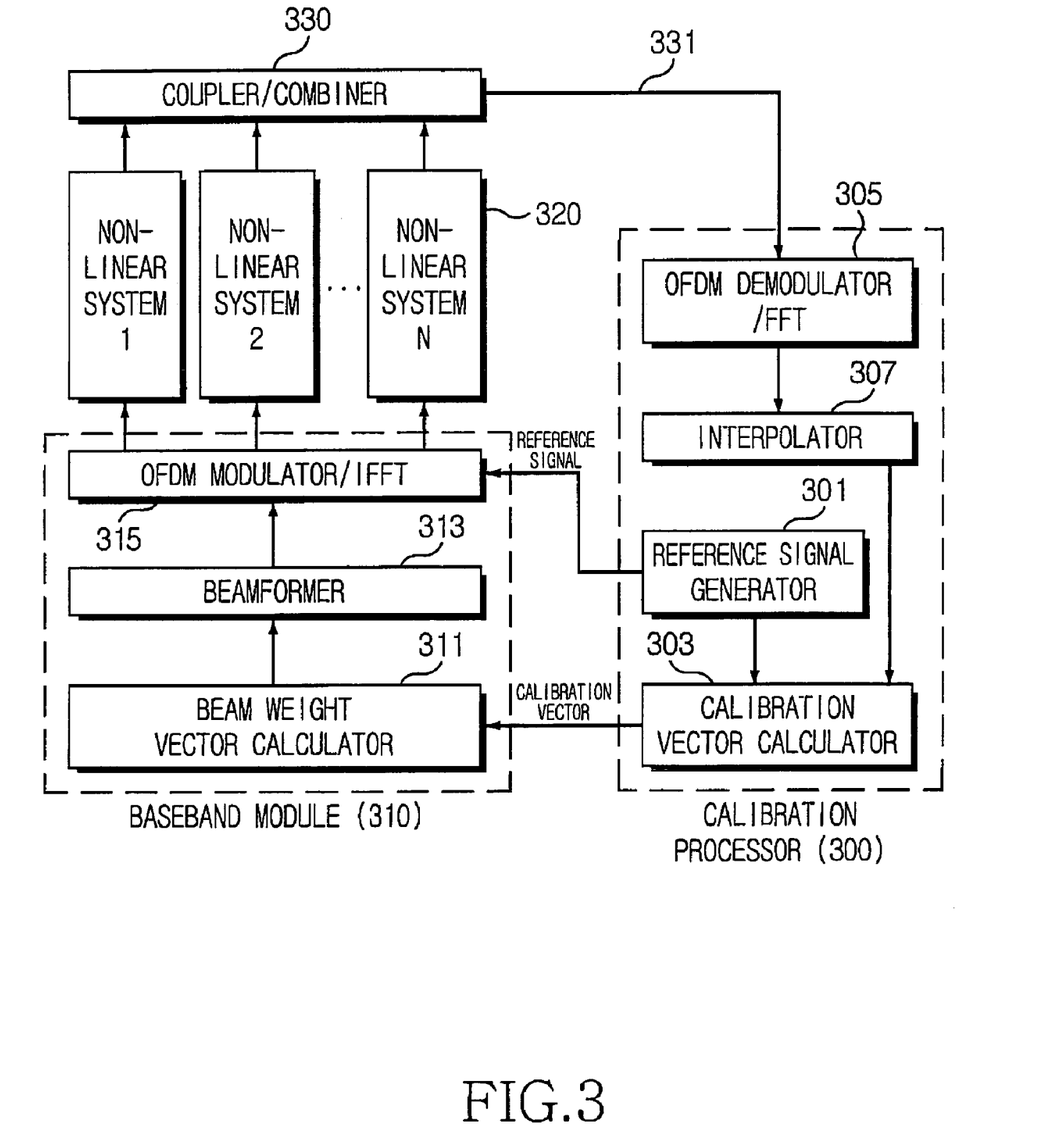
FIG. 3 is a block diagram of a transmission path calibrating apparatus in a multicarrier communication system using multiple antennas according to the present invention.

FIG. 3 is a block diagram of a transmission path calibrating apparatus in a multicarrier communication system using multiple antennas according to the present invention.

Referring to FIG. 3, the transmission path calibrating apparatus includes a calibration processor 300 for calibration, a baseband module 310, first to $n^{th}$ non-linear systems (non-linear system 1 to non-linear system n) 320, and a coupler/combiner 330. The calibration processor 300 has a reference signal generator 301, a calibration vector calculator 303, an OFDM demodulator/FFT 305, and an interpolator 307. The baseband module 310 has a beam weight vector calculator 311, a beamformer 313, and an OFDM modulator/IFFT 315.

In the calibration processor 300, the reference signal generator 301 generates a reference signal for each path, by which to estimate a change in phase and amplitude in the non-linear system of the path.

The OFDM modulator/IFFT 315 of the baseband module 310 IFFT-processes a data signal or the reference signal for each transmission path and provides the IFFT signals to a corresponding non-linear system in the transmission path. In particular, the OFDM modulator/IFFT 315 maps the IFFT signals to subcarriers allocated to the transmission path. Subcarriers for delivering the reference signal are allocated such that they are not overlapped in different transmission paths.

Non-linear system 1 to non-linear system n in respective transmission paths oversample signals received from the baseband module 310, modulate the oversampled signals to RF signals, and send the RF signals in the transmission paths via the coupler/combiner 330.

The coupler/combiner 330 couples the reference signal in each transmission path. The calibration processor 300 estimates the phase and amplitude change of the non-linear system 320 of the transmission path using the coupled signal received from the coupler/combiner 330 in a calibration reception path 331.

The OFDM demodulator/FFT 305 demodulates the reference signal received in the calibration reception path 331, thus separating subcarrier signals from one another. The interpolator 307 estimates reference signals over subcarriers to which the reference signals are not allocated by interpolating the reference signals for the respective transmission paths received from the OFDM demodulator/FFT 305.

The calibration vector calculator 303 of the calibration processor 300 calculates a calibration vector for each of the transmission paths using the reference signal generated and sent from the reference signal generator 301 and phase and amplitude changes in all subcarriers of the transmission paths, estimated by the interpolator 307. In other words, the phase and amplitude changes in the non-linear systems of the respective transmission paths are estimated using the generated reference signals and the received reference signals, and calibration vectors are calculated using the estimates.

The beam weight vector calculator 311 of the baseband module 310 calculates beam weight vectors using the calibration vectors and corrects beam weight vectors for the transmission paths. The beamformer 313 forms beams using the corrected beam weight vectors and sends data signals to the OFDM modulator/IFFT 315.

Figure 4:
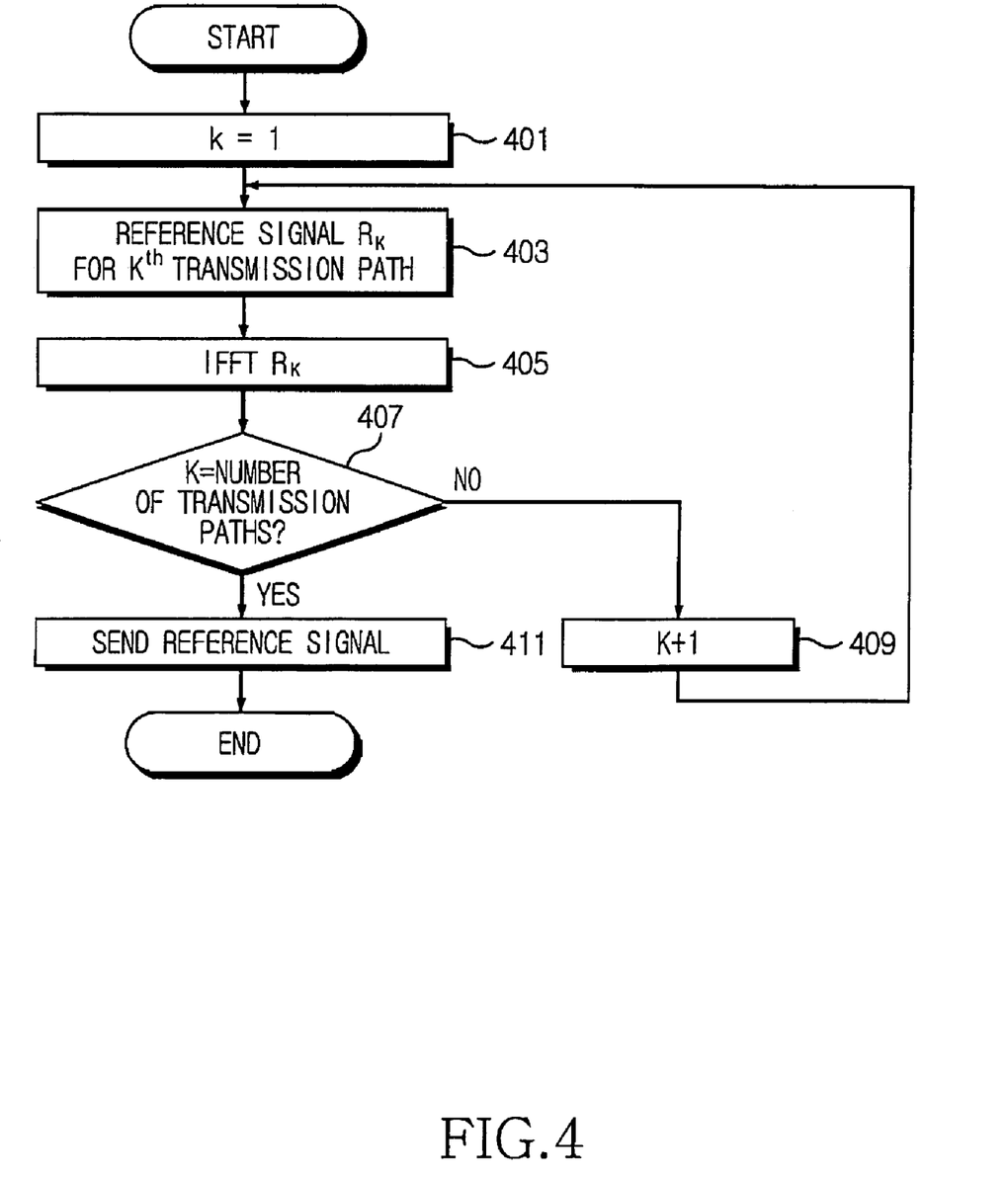
FIG. 4 is a flowchart illustrating an operation for sending a reference signal for transmission path calibration in the multicarrier communication system using multiple antennas according to the present invention.

FIG. 4 is a flowchart illustrating an operation for sending a reference signal for transmission path calibration in the multicarrier communication system using multiple antennas according to the present invention.

Referring to FIG. 4, the reference signal generator 301 sets a transmission path index K to 1 in step 401. In step 403, the reference signal generator 301 generates a reference signal $R_k$ for a $K^{th}$ transmission path and provides the reference signal $R_k$ to the OFDM modulator/IFFT 315 of the baseband module 310. The OFDM modulator/IFFT 315 IFFT-processes the reference signal $R_k$ in step 405. The reference signal $R_k$ is used to estimate a change in phase and amplitude occurring in the non-linear system 320 of the $K^{th}$ transmission path.

The reference signal generator 301 compares K with the number of transmission paths in step 407. If K is equal to the number of transmission paths, the OFDM modulator/IFFT 315 sends the IFFT reference signals on subcarriers allocated for the transmission paths in step 411. The allocated subcarriers are not overlapped in different transmission paths. If K is different from the number of transmission paths, the reference signal generator 301 increases K by 1 in step 409 and generates a reference signal $R_k$ for the $K^{th}$ transmission path in step 403.

Figure 5:
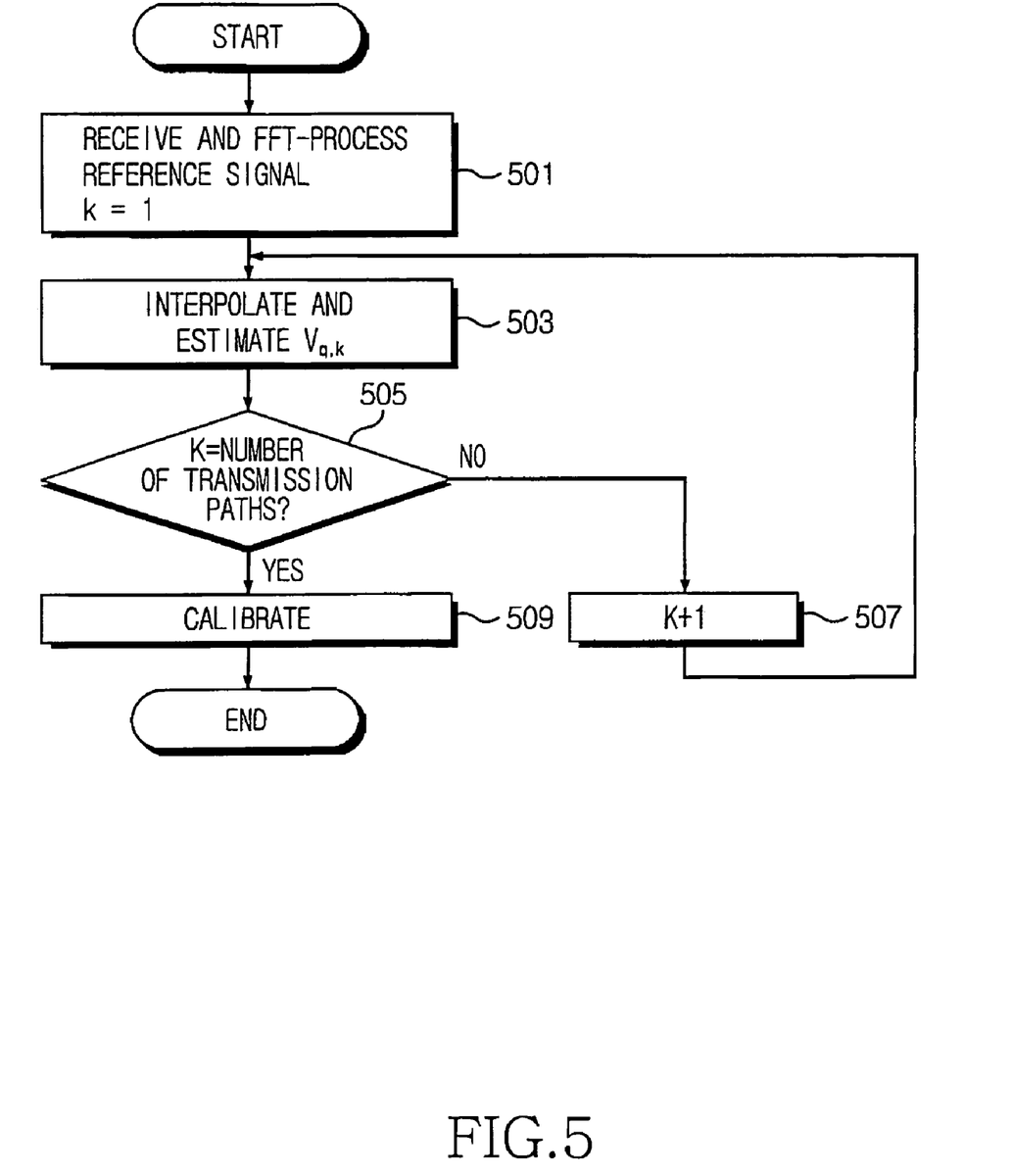
FIG. 5 is a flowchart illustrating an operation for receiving the reference signal for transmission path calibration in the multicarrier communication system using multiple antennas according to the present invention.

FIG. 5 is a flowchart illustrating an operation for receiving the reference signal for transmission path calibration in the multicarrier communication system using multiple antennas according to the present invention.

Referring to FIG. 5, the OFDM demodulator/FFT 305 FFT-processes reference signals received in the calibration reception path 331 in step 501. Here, the transmission path index K is set to 1. The received reference signals are the responses of reference signals generated for the respective transmission paths and passed through the non-linear systems 320, expressed as Equation (1):

$$Y_{q,k} = R_{q,k} V_{q,k} + N_o \qquad (1)$$

where $R_{q,k}$ denotes a reference signal on a $q^{th}$ subcarrier in a $k^{th}$ transmission path, $V_{q,k}$ denotes a phase and amplitude change of a $q^{th}$ subcarrier in the non-linear system, $Y_{q,k}$ denotes the received response of the reference signal and $N_O$ is a thermal noise. According to Equation (1), the changes in phase and amplitude on subcarriers allocated for each transmission path can be estimated.

In step 503, the interpolator 307 interpolates the signals received from the OFDM demodulator/FFT 305, thereby estimating reference signals over subcarriers to which reference signals were not allocated. The calibration vector calculator 303 calculates the phase and amplitude changes of all subcarriers in each transmission path using the reference signal generated for the transmission path from the reference signal generator 301 and the signal received from the interpolator 307. A phase and amplitude change of a $q^{th}$ subcarrier in the non-linear system corresponding to a $k^{th}$ transmission path is given as Equation (2):

$$\hat{V}_{q,k} = \frac{Y_{q,k}}{R_{q,k}} \qquad (2)$$

In step 505, the interpolator 307 compares K with the number of transmission paths. If K is different from the number of transmission paths, the interpolator 307 increases K by 1 in step 507 and interpolates received signals in step 503. If K is equal to the number of transmission paths, in step 509, the calibration vector calculator 303 determines that phase and amplitude changes have been estimated for all subcarriers in all transmission paths and calculates a calibration vector $C'_{q,k}$ for each transmission path based on $V_{q,k}$ according to Equation (3):

$$\hat{W}_{q,k} = \frac{W_{q,k}}{C'_{q,k}}, \qquad (3)$$

$$\left( C'_{q,k} = \frac{\hat{V}_{q,k}}{V_{ref,k}} \right)$$

where $V_{ref,k}$ denotes a reference estimate among estimates for all transmission paths. The estimates of the transmission paths are normalized to $V_{ref,k}$ and thus relative calibration vectors $C'_{q,k}$ can be calculated. The beam weight vector calculator 311 corrects the beam weight vectors $W_{q,k}$ with the calibration vectors $C'_{q,k}$. In this way, the beamformer 313 can generate a beam pattern in a desired direction. Then the process of the present invention is terminated.

Figure 6:
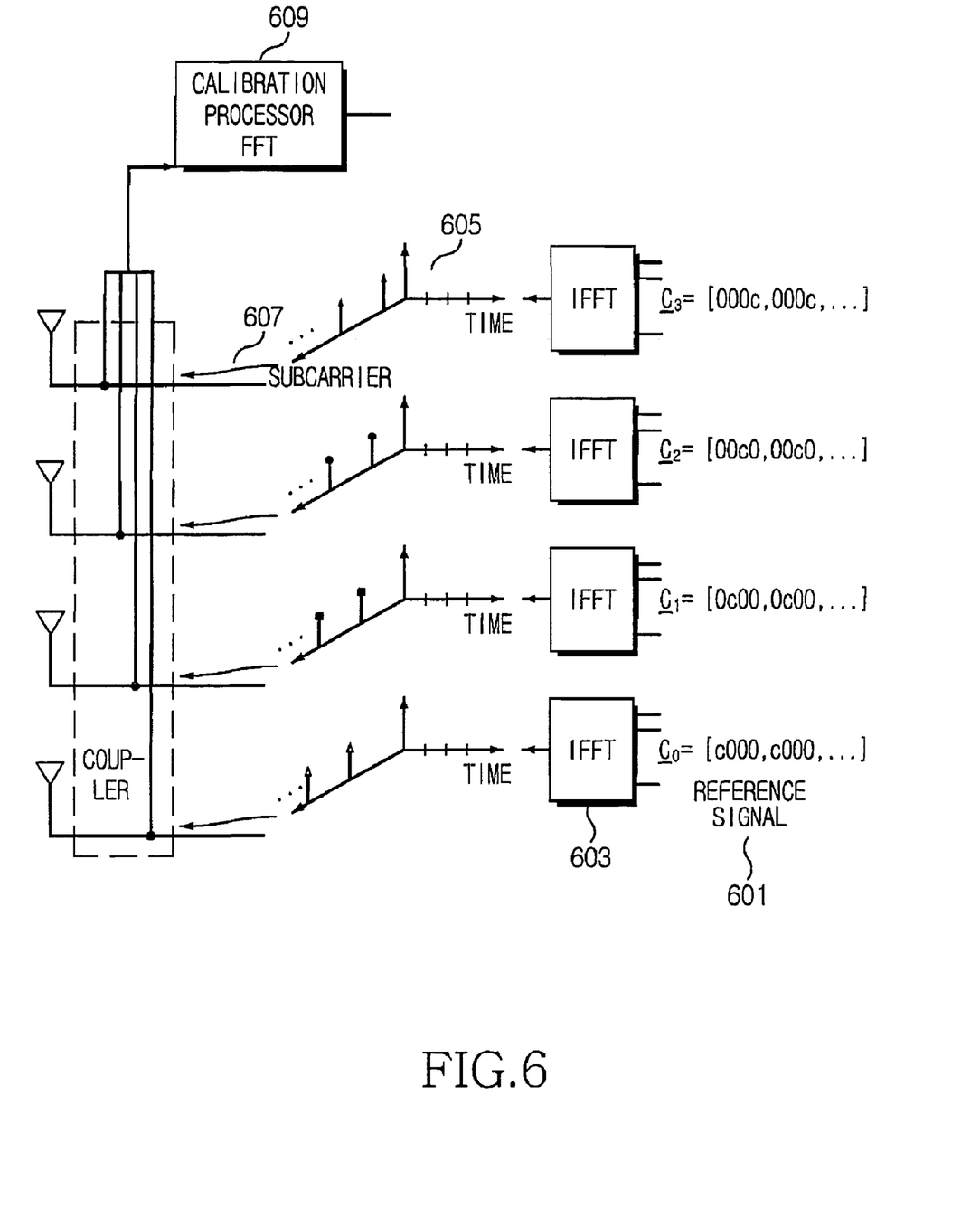
FIG. 6 illustrates a transmission path calibration operation in the multicarrier communication system using multiple antennas according to the present invention.

FIG. 6 illustrates a transmission path calibration operation according to the present invention.

Referring to FIG. 6, the BS generates a reference signal 601 for each transmission path to calibrate the transmission path, IFFT-processes the reference signal as indicated by reference numeral 603, and sends the IFFT signals on different subcarriers 605. When the reference signal 601 reaches to a calibration processor FFT 609 via a predetermined path 607, the reference signal is demodulated.

Figure 7:
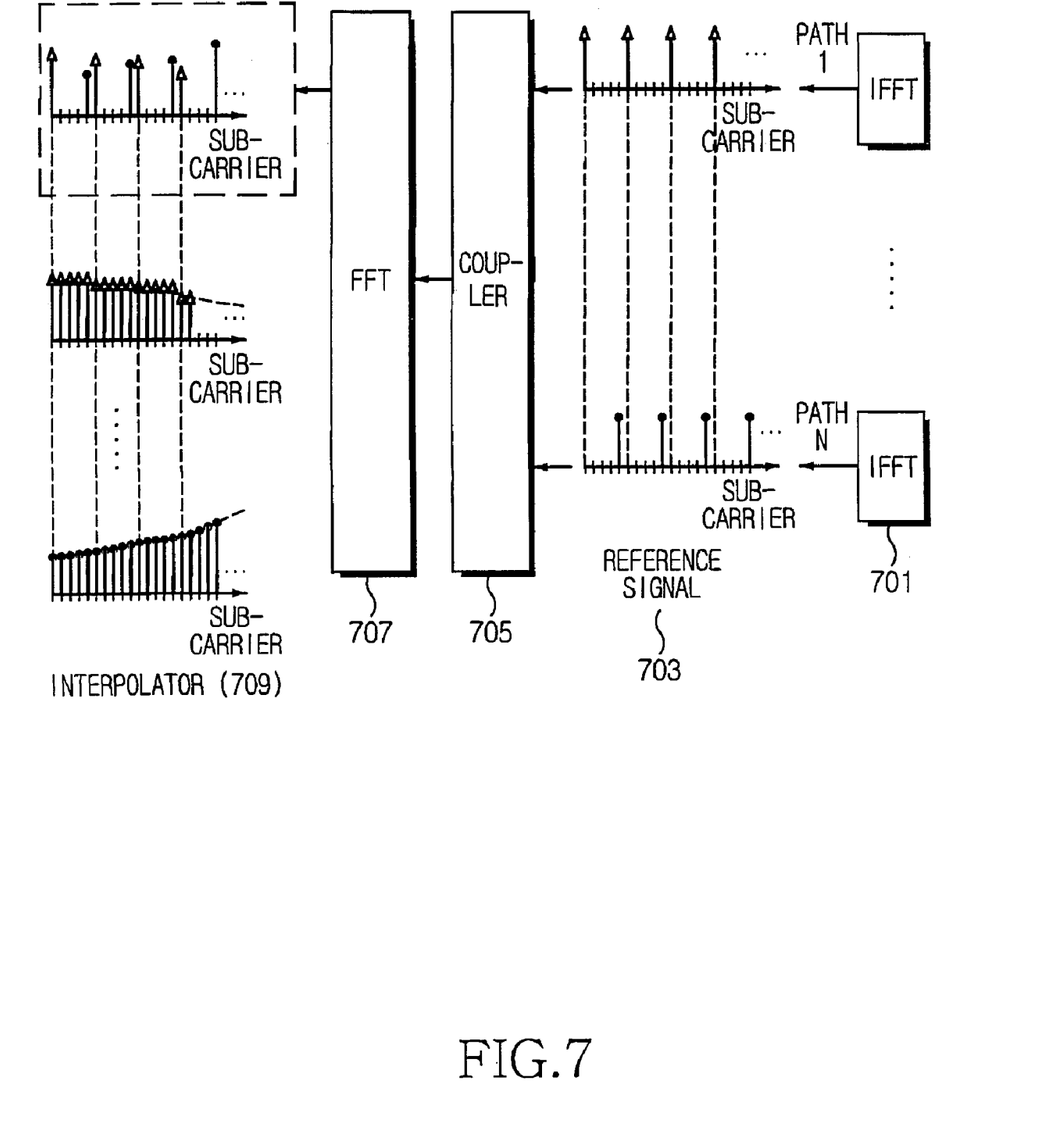
FIG. 7 illustrates a reference signal transmission operation in the multicarrier communication system using multiple antennas according to the present invention.

FIG. 7 illustrates a reference signal transmission operation in the multicarrier communication system using multiple antennas according to the present invention.

Reference subcarriers are sent from IFFT 801 in a baseband module via a coupler 805 to FFT in a calibration processor. Changes in phase and amplitude on all subcarriers are estimated by interpolation in an interpolator 709 illustrated in FIG. 7, calibration vectors are calculated using the estimates, and thus the transmission paths are calibrated using the calibration vectors.

Figure 8:
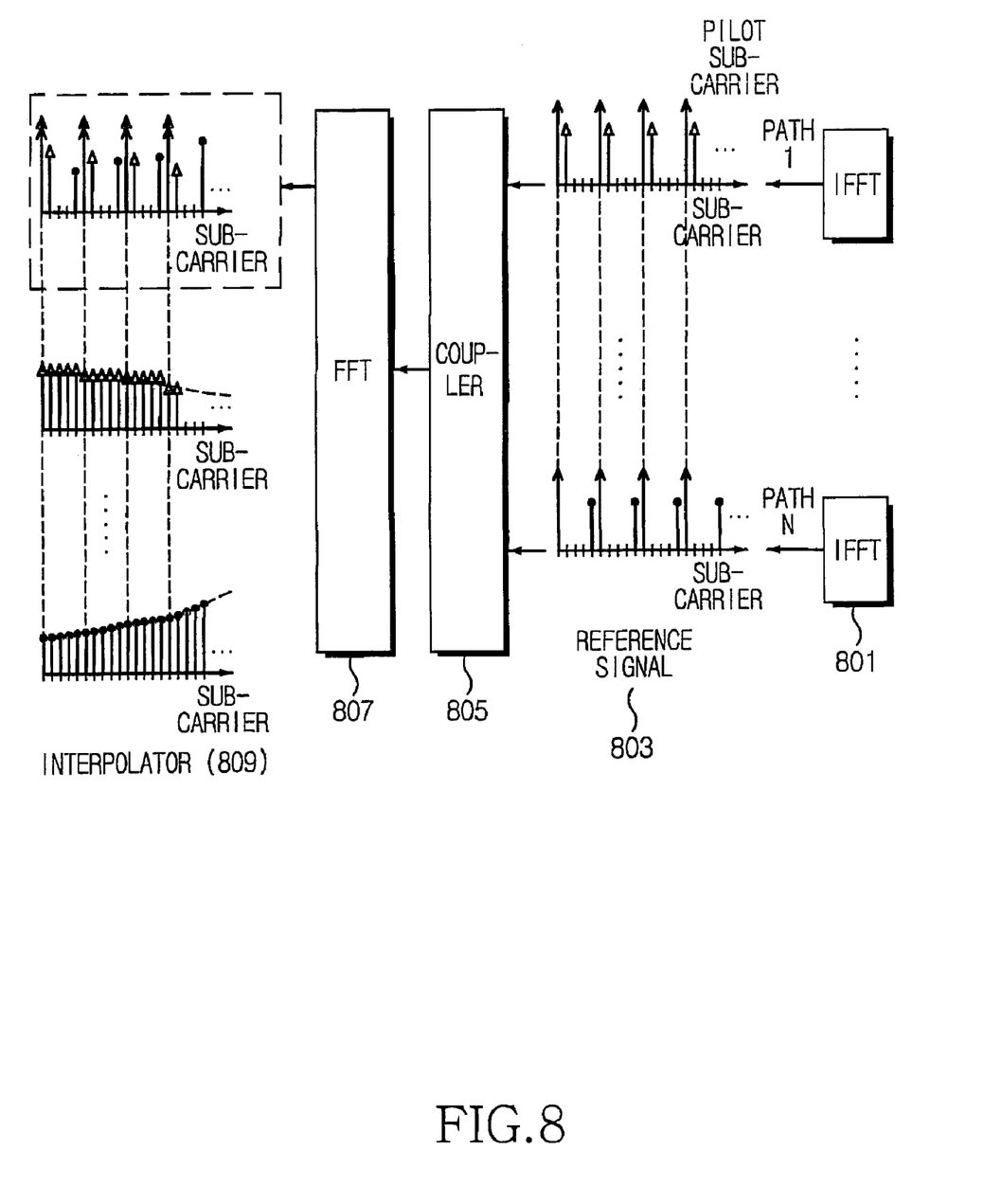
FIG. 8 illustrates another reference signal transmission operation in the multicarrier communication system using multiple antennas according to the present invention.

FIG. 8 illustrates another reference signal transmission operation in the multicarrier communication system using multiple antennas according to the present invention.

Referring to FIG. 8, an MS uses pilot subcarriers in adjacent symbols, for channel estimation. Use of pilot subcarriers is different from FIG. 7. If a signal other than the pilot subcarrier signal is sent, the channel estimation performance of adjacent OFDM symbols may be degraded. Therefore, subcarriers other than pilot subcarriers are used for calibration and a reference signal 803 is allocated to the calibration subcarriers in each transmission path. When the reference signal reaches a calibration processor via a predetermined path, the reference signal is demodulated, thus separating the subcarriers from one another. Changes in phase and amplitude on all subcarriers are estimated by interpolation in an interpolator 809, calibration vectors are calculated using the estimates, and thus the transmission paths are calibrated using the calibration vectors.

As described above, the present invention provides an apparatus and 4 method for simultaneously calibrating all paths based on orthogonality between subcarriers in a multicarrier communication system using multiple antennas. Therefore, the resulting decrease of calibration time minimizes a decrease in calibration accuracy caused by the change of hardware characteristics over time, and the simultaneous transmission of calibration signals in a plurality of paths minimizes the decrease of data throughput caused by the transmission of the calibration signals.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for calibrating transmission paths in a multicarrier communication system using multiple antennas, comprising:
a calibration processor for generating reference signals allocating the generated reference signals to subcarriers and calculating calibration vectors for the transmission paths using the generated reference signals and reference signals received through transmission paths; and
a baseband module for inverse-fast-Fourier-transform (IFFT)-processing the generated reference signals allocated to the subcarriers and sending the IFFT signals in the transmission paths,
wherein the calibration processor comprises:
a reference signal generator for generating the reference signals and allocating the generated reference signals to the subcarriers which are different in each of transmission paths;
a fast Fourier transform (FFT) processor for separating the received reference signals;
an interpolator for estimating reference signals of subcarrier to which the generated reference signals are not allocated by interpolating the subcarrier signals; and
a calibration vector calculator for calculating the calibration vectors for the respective transmission oaths using the interpolated reference signals and the received reference signals.

2. The apparatus of claim 1, wherein the baseband module corrects beam weight vectors using the calibration vectors and forms beams using the corrected beam weight vectors.

3. The apparatus of claim 2, wherein the baseband module comprises:
a plurality of IFFT processors for IFFT-processing the generated reference signals allocated to the subcarriers and sending the IFFT signals in the transmission paths;
a beam weight vector calculator for correcting beam weight vectors using the calibration vectors; and
a beamformer for forming beams using the corrected beam weight vectors.

4. A method of calibrating transmission paths in a multicarrier communication system using multiple antennas, comprising the steps of:
generating reference signals and allocating the generated reference signals to subcarriers which are different in each of the transmission paths;
inverse-fast-Fourier-transform (IFFT)-processing the generated reference signals allocated to the subcarriers and sending the IFFT signals in transmission paths; and
calculating calibration vectors for the transmission paths using the generated reference signals and reference signals received through the transmission paths,
wherein the calibration vector calculating step comprises:
separating the received reference signals;
estimating reference signals of subcarrier to which the generated reference signals are not allocated by interpolating the subcarrier signals; and
calculating the calibration vectors for the respective transmission paths using the interpolated reference signals and the received reference signals.

5. The method of claim 4, further comprising:
correcting beam weight vectors using the calibration vectors; and
forming beams using the corrected beam weight vectors.

6. The method of claim 4, wherein the subcarriers to which the generated reference signals are allocated are subcarriers other than pilot subcarriers.

7. The method of claim 4, wherein the subcarriers to which the generated reference signals are allocated are pilot subcarriers.

8. An apparatus for calibrating transmission paths in a multicarrier communication system using multiple antennas, comprising:
a calibration processor for generating reference signals, allocating the generated reference signals to subcarriers in each of the transmission paths, and calculating calibration vectors using the generated reference signals and reference signals received through the transmission paths; and
a baseband module for processing the generated reference signals allocated to the subcarriers and sending the processed signals in the transmission paths,
wherein the calibration processor comprises:
a reference signal generator for generating the reference signals and allocating the generated reference signals to the subcarriers in each of the transmission paths;
a processor for separating the received reference signals;
an interpolator for estimating reference signals of subcarrier to which the generated reference signals are not allocated by interpolating the subcarrier signals; and
a calibration vector calculator for calculating the calibration vectors for the respective transmission paths using the interpolated reference signals and the received reference signals.

9. The apparatus of claim 8, wherein the baseband module corrects beam weight vectors using the calibration vectors from the calibration processor and forms beams using the corrected beam weight vectors.

10. The apparatus of claim 8, wherein the baseband module comprises:
a plurality of processors for processing the generated reference signals allocated to the subcarriers and sending the processed signals in the transmission paths;
a beam weight vector calculator for correcting beam weight vectors using the calibration vectors; and
a beamformer for forming beams using the corrected beam weight vectors.

11. A method of calibrating transmission paths in a multicarrier communication system using multiple antennas, comprising the steps of:
generating reference signals and allocating the generated reference signals to subcarriers in each of the transmission paths;
processing the generated reference signals allocated to the subcarriers and sending the processed signals in the transmission paths; and
calculating calibration vectors for the transmission paths using the generated reference signals and reference signals received through the transmission paths,
wherein the calibration vector calculating step comprises:
separating the received reference signals;
estimating reference signals of subcarrier to which the generated reference signals are not allocated by interpolating the subcarrier signals; and
calculating the calibration vectors for the respective transmission oaths using the interpolated reference signals and the received reference signals.

12. The method of claim 11, further comprising:
correcting beam weight vectors using the calibration vectors; and
forming beams using the corrected beam weight vectors.

13. The method of claim 11, wherein the subcarriers to which the generated reference signals are allocated are subcarriers other than pilot subcarriers.

14. The method of claim 11, wherein the subcarriers to which the generated reference signals are allocated are pilot subcarriers.

* * * * *